Aug. 5, 1958 J. R. HANSON 2,845,983
BENT METAL DOOR STRETCHER
Filed Feb. 12, 1954
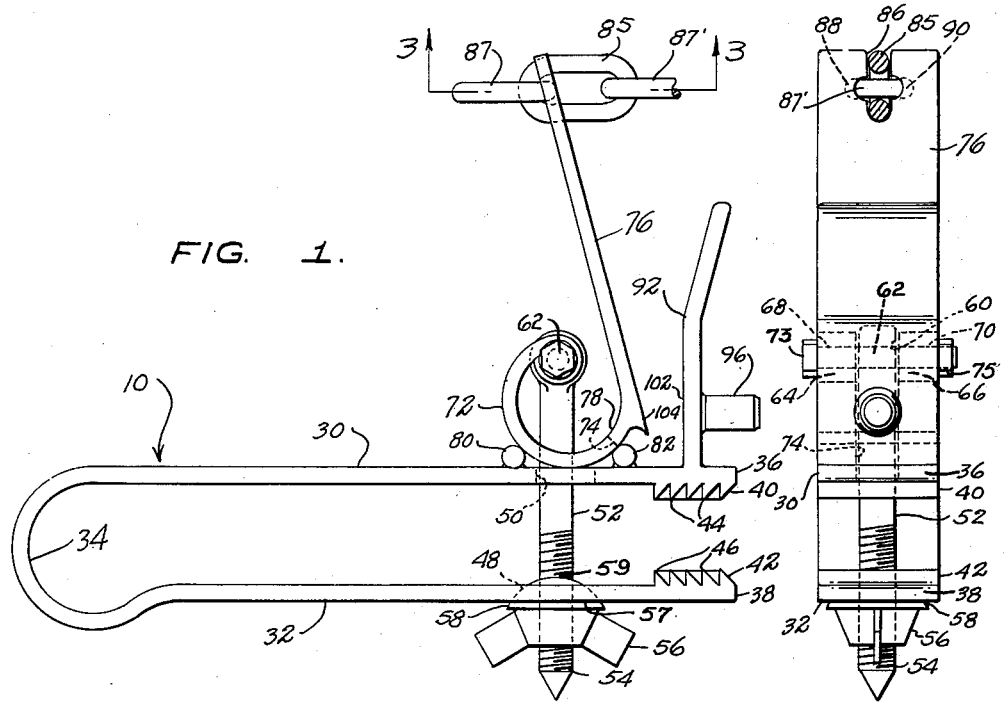
FIG. 1.
FIG. 2.
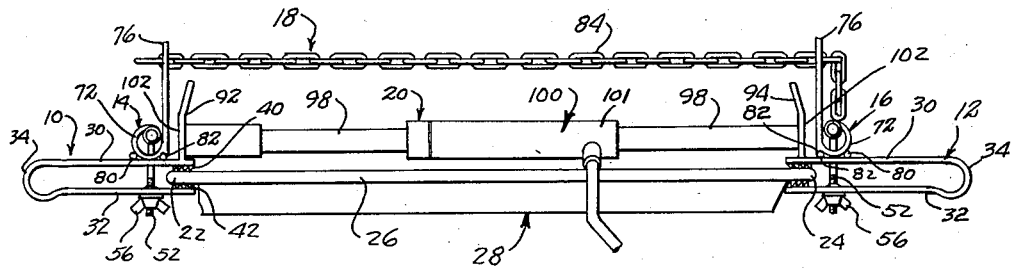
FIG. 4.
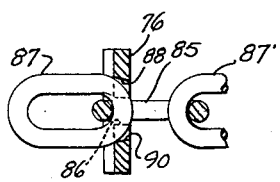
FIG. 3.
INVENTOR.
JULIAN R. HANSON,
BY
McMorrow, Berman + Davidson
ATTORNEYS.

United States Patent Office 2,845,983
Patented Aug. 5, 1958

2,845,983

BENT METAL DOOR STRETCHER

Julian R. Hanson, Tucson, Ariz.

Application February 12, 1954, Serial No. 409,831

5 Claims. (Cl. 153—35)

This invention relates to an improved stretcher for removing dents and other deformations from sheet metal objects, such as metal doors.

The primary object of this invention is to provide a more efficient and generally superior device of this kind which in its operation provides more positive and reliable and progressively greater clamping of the device to he object in conjunction with application of increasing stretching action of the device, so that the object is securely held regardless of the amount of stretching action required to remove deformations from the object, without the need for hammering or of other deleterious straightening operations on the object.

Another important object of the invention is to provide a device of this kind which is of simple construction, is easy to apply and operate, and which can be made in rugged and serviceable forms at relatively low cost.

Other objects and advantages will become apparent from the following detailed description, forming the specification, taken in conjunction with the accompanying drawing, wherein:

Figure 1 is a fragmentary side elevational view of a device embodying this invention, showing a clamp, and the cam and cam actuating means thereof;

Figure 2 is a left-hand end elevation of Figure 1;

Figure 3 is a fragmentary cross sectional view taken on line 3—3 of Figure 1; and Figure 4 is a side elevational view of the said device, applied to a metal door.

With continued reference to the drawing, the illustrated device of the present invention comprises a pair of clamps 10 and 12, cam means 14 and 16 operatively associated with the clamps 10 and 12, respectively, cam actuating means 18 operatively connected to the cam means 14 and 16 and extending therebetween, and powered extensible means 20 disposed between the clamps 10 and 12 and operative to move the clamps away from each other.

The clamps 10 and 12 are adapted to grip opposite ends 22 and 24 of a sheet metal panel 26 which may be a part of a door 28, the clamps 10 and 12 being oppositely disposed relative one to the other. The clamps 10 and 12 are identical, and each clamp is made of relatively thin spring steel and is U-shaped and has a first or upper arm 30, a second or lower arm 32 and a looped bight portion 34 connecting the upper and lower arms at one end thereof and resiliently urging the arms away from each other. The facing sides of the free inner ends 36 and 38 of the respective arms 30 and 32 have thereon jaws 40 and 42, respectively, provided with sets of ratchet-type gripping teeth 44 and 46, respectively.

The lower arm 32 is provided near the inner end with a countersunk hole, while the upper arm 30 is provided with an elongated slot 50 extending lengthwise thereof, which is aligned with the hole 48. An adjusting bolt 52 extends through the slot 50 and the hole 48 and beyond the upper and lower arms. The threaded lower end 54 of the bolt 52 extends through the countersunk hole 48 and has engaged thereon a wing nut 56. The wing nut 56 engages the flat face 57 of a half-ball washer 58 on the adjusting bolt 52 with the convex face 59 of the washer engaged within the countersunk hole 48 whereby the bolt 52 can swing and swivel relative to the lower arm 32. The washer 58 and the wing nut 56 are disposed at the side of the lower arm 32 remote from the upper arm 30.

The upper end of the adjusting bolt 52 has a transverse bore 60 therethrough receiving the shank of a pivot bolt 62 which also passes through aligned and registering openings 64 and 66 formed in respective barrels 68 and 70 on one end of a cam 72 of the cam means 14. The bolt 62 is secured in place by a head 73 and a nut 75 on its opposite ends and bearing against outer ends of the related barrels.

The cam means 14 and 16 are identically constructed but are in reversed relation to each other. The cam 72 is arcuate, and a major portion of the length of the cam 72 has a medial longitudinal slot 74 which freely receives therein the shank of the adjusting bolt 52. The cam 72 is arranged to be moved about the axis of the pivot bolt 62 by a cam lever arm 76 formed integrally with the end 78 of the cam 72 remote from the end thereof journaled on the pivot bolt 52. The cam 72 is guided in its arcuate path of movement by a pair of cam guides 80 and 82 fixed on the upper side of the arm 30 and extending transversely thereof at opposite sides of the adjusting bolt 52.

The cam lever arm 76 extends upwardly from and longitudinally outwardly with respect to the cam 72 and the upper arm 30.

The cam operating means 18 comprise a link chain 84 extending between the upper ends of the cam lever arms 76 of the cam means 14 and 16. Each of the cam lever arms 76 is provided in its upper free end with a medial vertical chain receiving slot 86 which has opposed recesses 88 and 90 in its outward side which constitutes retaining seats for an end of a horizontally disposed link 87 of the chain 84, with a vertically disposed link 87 in the slot 86, so that the chain 84 is secured to the arm 76 against inward movement toward the other cam means.

The upper arms 30 of the clamps 10 and 12 have fixed thereon adjacent their free inner ends 36 and 38, perpendicular pressure arms 92 and 94, respectively, which rise from the jaws 30, and these arms have on their inward sides fixed solid cylindrical pipe guides 96. The pipe guides 96 are adapted to receive thereon the outer ends of tubular jack rods 98 of a conventional hydraulic jack 100, which constitutes the forward extensible means 20.

The pipe guides 98 extend inwardly from lower portions 102 of the pressure arms 92 and 94. When the jack 100 is extended, as by fluid under pressure acting in a jack cylinder 101, engaged with the inner ends of the jack rods 98, the clamps 10 and 12 will be moved away from each other, in a straight line.

In operation, the spread of the clamps 10 and 12 are first adjusted by means of the wing nuts 56 on the adjusting bolts 52 so that the jaws 40 and 42 securely engage opposite sides of the edges 22 and 24 of the door panel 26. The hydraulic jack 100 is then placed between the two clamps with the jack rods 98 engaged on the guides 96. As the jack 100 is extended and pushes the pressure arms 92 and 94 away from each other, the chain 84 is tightened and exerts pull on and rotates the cam lever arms 76 toward each other so as to cause the cams 72 to rotate in opposite directions and move the upper clamp arms 30 toward the lower clamp arms 32, until stop lugs 104 on the inner ends of the cams engage the inner cam guides 82. As the jack 100 is further extended the engagement of the lugs 104 with the guides 82 acts to raise the cams 72 out of engagement with the upper surfaces of the upper arms 30 and force the jaws 40 and 42 still more tightly together, and thereby more firmly grip the respective edges 22 and 24 of the panel 26. It is evident that the stop lugs 104 function as fulcrums engaging the upper sides of the upper clamp arms 30 and acting to increase the clamping action of the jaws 40 and 42 beyond the point obtainable by operation of the cams 72.

While there are shown and described the preferred embodiment of the invention, it is to be understood that the structure is susceptible to change and modification within the practicability of the invention and is limited only by the scope of the claims appended hereto.

What is claimed is:

1. A sheet metal panel stretching device comprising a pair of cam operated clamps for engagement with opposed edges of a panel to be stretched, said clamps having cam operating lever arms, a chain secured to and extending between said lever arms, and an extensible jack positioned between and bearing against portions of the clamps for pushing the clamps away from each other so as to cause said chain to tighten and operate the cam operating lever arms in clamping directions.

2. A sheet metal panel stretching device according to claim 1, wherein said clamps have pressure arms having lateral jack guides thereon, and said jack has tubular jack rods having outer ends removably engaged on said jack guides.

3. A sheet metal panel stretching deivce according to claim 1, wherein each of said clamps comprises a pair of upper and lower arms having free ends having facing sides, jaws on said facing sides, a cam journaled on said pair of arms and operatively bearing upon one of said arms, each operating lever arm being fixed on a cam and having free ends to which said chain is secured.

4. A sheet metal panel stretching device according to claim 1, wherein each of said clamps comprises a pair of upper and lower arms having free ends having facing sides, jaws on said facing sides, a cam journaled on said pair of arms and operatively bearing upon one of said arms, each operating lever arm being fixed on a cam and having free ends to which said chain is secured, said cams each having a stop lug on one end thereof which is engageable with a portion of said one clamp arm so as to serve as a fulcrum engaging said one arm for disengaging the cam from said one arm and forcing said jaws further toward each other as the jack is extended beyond a certain point.

5. A sheet metal panel stretching device according to claim 1, wherein each of said clamps comprises a pair of upper and lower arms having free ends having facing sides, jaws on said facing sides, a cam journaled on said pair of arms and operatively bearing upon one of said arms, each operating lever arm being fixed on a cam and having free ends to which said chain is secured, means resiliently connecting the clamp arms and urging the clamp arms away from each other, and means journaling the cam on the clamp arms comprising an adjusting bolt traversing the clamp arms, a nut threaded on one end of the adjusting bolt and bearing against the clamp arm other than said one clamp arm on the side of said other arm remote from said one arm, and a pivot bolt on the other end of the adjusting bolt at the side of said one arm remote from said other arm, said cam being journaled on said pivot bolt.

References Cited in the file of this patent

UNITED STATES PATENTS

| | | |
|---|---|---|
| 233,964 | Bear | Nov. 2, 1880 |
| 312,608 | Britton | Feb. 24, 1885 |
| 347,488 | Hunsicker | Aug. 17, 1886 |
| 357,749 | Yale | Feb. 15, 1887 |
| 1,911,274 | Handley | May 30, 1933 |
| 2,201,144 | Scott | May 21, 1940 |
| 2,734,549 | Thorley | Feb. 14, 1956 |

FOREIGN PATENTS

| | | |
|---|---|---|
| 620,072 | France | Apr. 14, 1927 |